(12) United States Patent
Jikuhara et al.

(10) Patent No.: US 12,380,385 B2
(45) Date of Patent: Aug. 5, 2025

(54) CONTROL APPARATUS, CONTROL METHOD, AND NON-TRANSITORY COMPUTER READABLE MEDIUM

(71) Applicant: TOYOTA JIDOSHA KABUSHIKI KAISHA, Toyota (JP)

(72) Inventors: Yoshikazu Jikuhara, Miyoshi (JP); Seii Sai, Yokohama (JP); Ibuki Shimada, Miyoshi (JP); Takahiro Aoki, Saitama (JP); Keishi Kinoshita, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 18/173,179

(22) Filed: Feb. 23, 2023

(65) Prior Publication Data
US 2023/0274211 A1    Aug. 31, 2023

(30) Foreign Application Priority Data
Feb. 25, 2022  (JP) .................................. 2022-028692

(51) Int. Cl.
*G06Q 10/00*      (2023.01)
*G06Q 10/02*      (2012.01)
*G06Q 10/0631*   (2023.01)
*G06Q 30/00*      (2023.01)
*G06Q 30/0207*   (2023.01)
*G08G 1/00*        (2006.01)
(Continued)

(52) U.S. Cl.
CPC ....... *G06Q 10/06315* (2013.01); *G06Q 10/02* (2013.01); *G06Q 30/0207* (2013.01); *G08G 1/0133* (2013.01); *G08G 1/096844* (2013.01); *G08G 1/202* (2013.01)

(58) Field of Classification Search
CPC ..................................................... G06Q 50/47
See application file for complete search history.

(56) References Cited

U.S. PATENT DOCUMENTS

2019/0146499 A1* 5/2019 Wang .................... G06Q 50/40
                                                                  701/26
2021/0035038 A1  2/2021 Suzuki et al.
(Continued)

FOREIGN PATENT DOCUMENTS

JP    2021022332 A    2/2021
KR    20200029175 A   3/2020
WO    2021/246236 A1  12/2021

OTHER PUBLICATIONS

Gimenez, F. M. P., Camargo, W. H. B. D., Gomes, A. C. B., Nihei, T. S., Andrade, M. W. M., Valverde, M. L. D. A. S., . . . & Grion, C. M. C. (2017). Analysis of adverse events during intrahospital transportation of critically ill patients. Critical care research and practice, 2017(1), 6847124. (Year: 2017).*

Primary Examiner — Matheus Ribeiro Stivaletti
(74) Attorney, Agent, or Firm — Dickinson Wright, PLLC

(57) ABSTRACT

A control apparatus includes a controller configured to acquire reservation information including a reservation time of a medical checkup for a user and a site of the medical checkup, acquire boarding positional information indicating a boarding position of the user, and generate a dispatch plan for a vehicle, that the user boards to travel between the boarding position and the site, based on the reservation information and the boarding positional information.

18 Claims, 6 Drawing Sheets

(51) Int. Cl.
  *G08G 1/01*    (2006.01)
  *G08G 1/0968*  (2006.01)

(56) References Cited

U.S. PATENT DOCUMENTS

| | | | |
|---|---|---|---|
| 2021/0374893 A1* | 12/2021 | Jepson | G16H 40/20 |
| 2022/0044344 A1* | 2/2022 | Ramot | G06Q 50/40 |
| 2022/0309925 A1* | 9/2022 | Schwendimann | B60W 60/0025 |
| 2023/0204366 A1 | 6/2023 | Nagano et al. | |

* cited by examiner

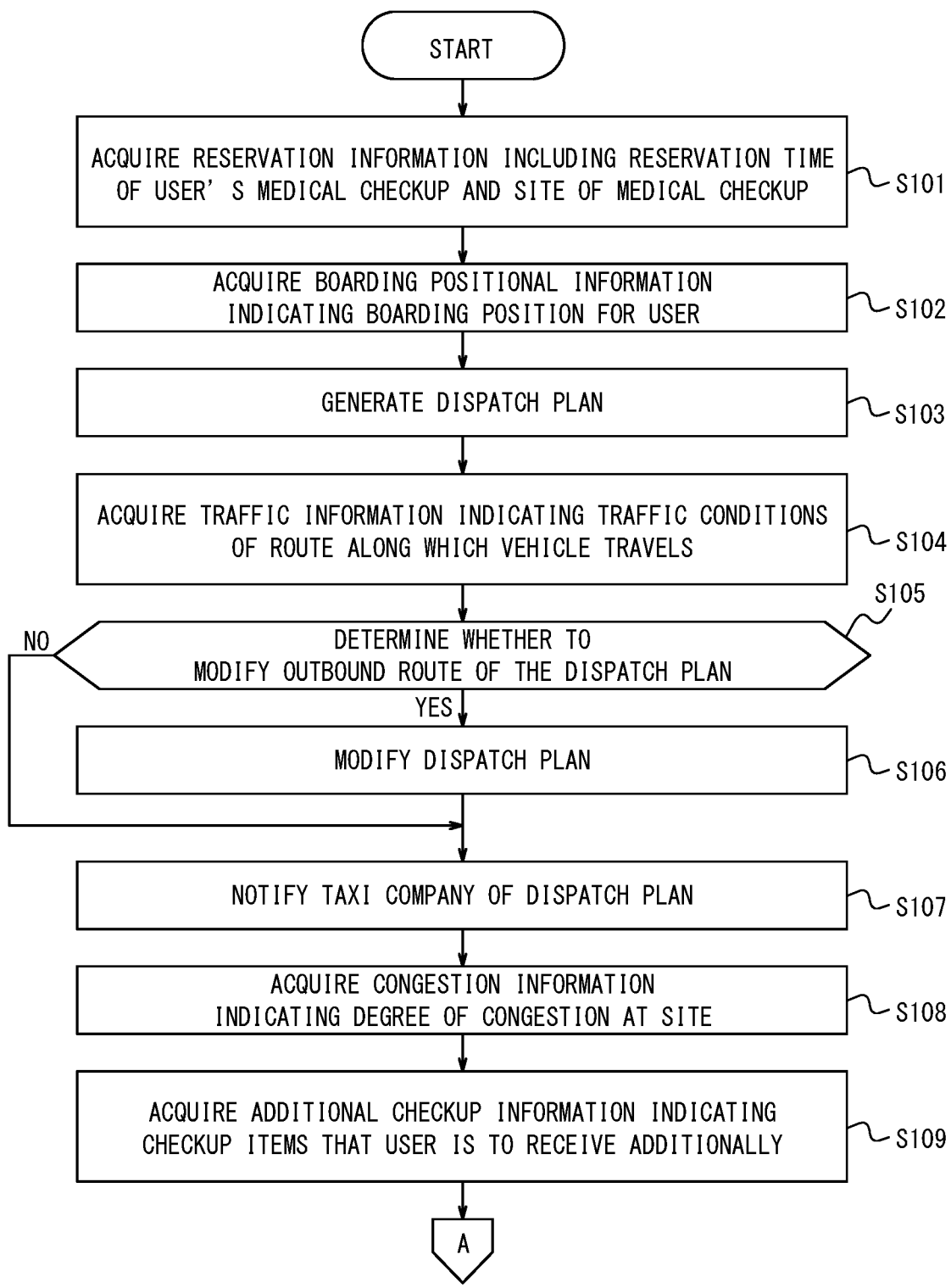

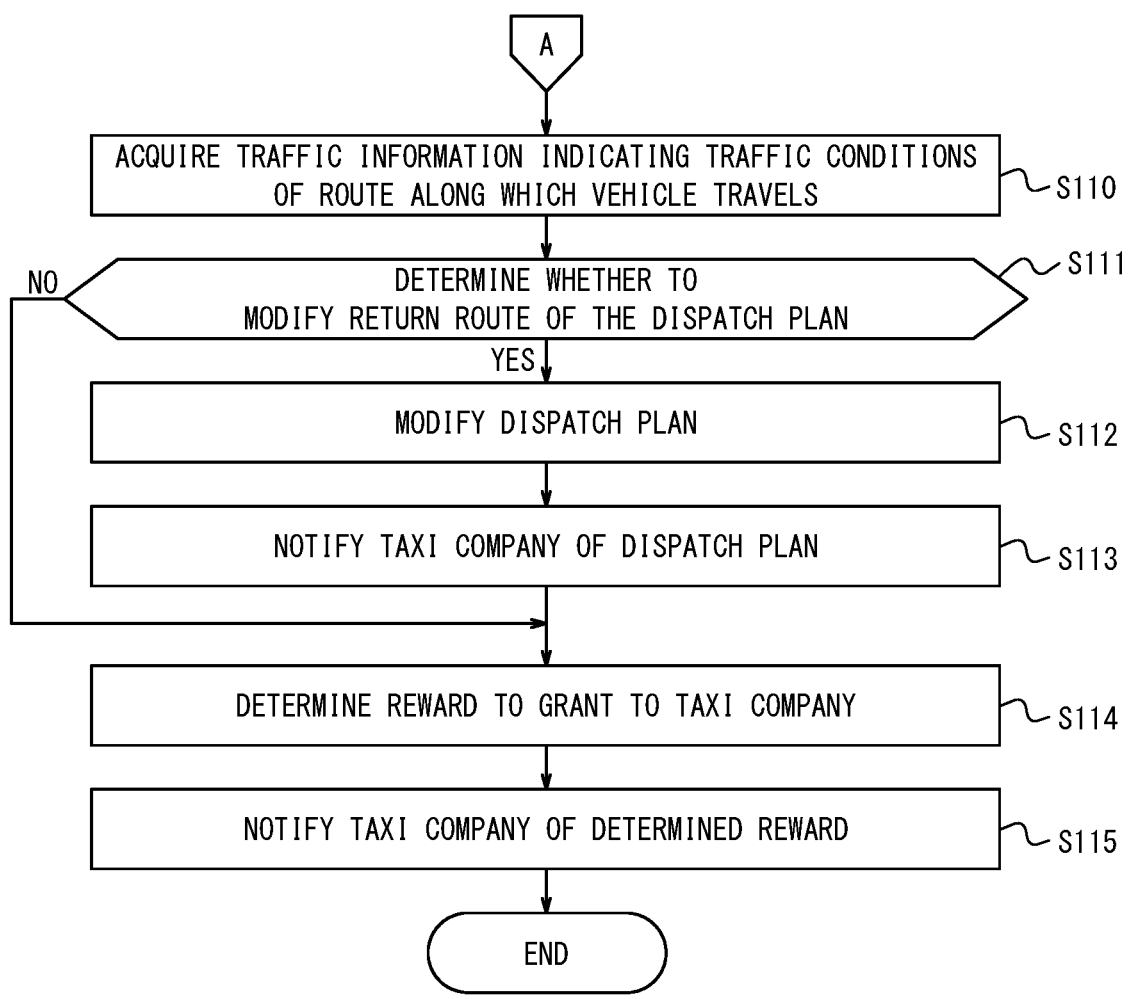

CONTROL APPARATUS, CONTROL METHOD, AND NON-TRANSITORY COMPUTER READABLE MEDIUM

CROSS-REFERENCE TO RELATED APPLICATION

This application claims priority to Japanese Patent Application No. 2022-028692 filed on Feb. 25, 2022, the entire contents of which are incorporated herein by reference.

TECHNICAL FIELD

The present disclosure relates to a control apparatus, a control method, and a program.

BACKGROUND

Technology for determining medical checkup equipment to be installed in a vehicle is known. For example, patent literature (PTL) 1 discloses determining the medical checkup equipment to be installed in a vehicle based on information on the user receiving the medical checkup.

CITATION LIST

Patent Literature

PTL 1: JP 2021-022332 A

SUMMARY

At the time a patient is to receive a medical checkup in a vehicle in which medical checkup equipment is installed, it is difficult for the patient to travel between home and the location of the medical checkup in a case in which the patient does not own a vehicle to travel to and from the medical checkup vehicle. The locations serving as medical checkup locations where vehicles are parked are not always easily accessible, and demand exists for technology that facilitates a patient's travel to and from the medical checkup location.

It would be helpful to provide technology for facilitating a patient's travel to and from a medical checkup location.

A control apparatus according to an embodiment of the present disclosure includes a controller configured to:
acquire reservation information including a reservation time of a medical checkup for a user and a site of the medical checkup;
acquire boarding positional information indicating a boarding position of the user; and
generate a dispatch plan for a vehicle, that the user boards to travel between the boarding position and the site, based on the reservation information and the boarding positional information.

A control method according to an embodiment of the present disclosure is a control method to be performed by a computer, the control method including:
acquiring reservation information including a reservation time of a medical checkup for a user and a site of the medical checkup;
acquiring boarding positional information indicating a boarding position of the user; and
generating a dispatch plan for a vehicle, that the user boards to travel between the boarding position and the site, based on the reservation information and the boarding positional information.

A program according to an embodiment of the present disclosure is configured to cause a computer to perform operations including:
acquiring reservation information including a reservation time of a medical checkup for a user and a site of the medical checkup;
acquiring boarding positional information indicating a boarding position of the user; and
generating a dispatch plan for a vehicle, that the user boards to travel between the boarding position and the site, based on the reservation information and the boarding positional information.

According to an embodiment of the present disclosure, technology that facilitates a patient's travel to and from a medical checkup location is provided.

BRIEF DESCRIPTION OF THE DRAWINGS

In the accompanying drawings:

FIG. 5A is a flowchart illustrating operations of the control apparatus according to the present embodiment; and FIG. 5B is a flowchart illustrating operations of the control apparatus according to the present embodiment.

DETAILED DESCRIPTION

Hereinafter, an embodiment of the present disclosure will be described.

Figure 1:
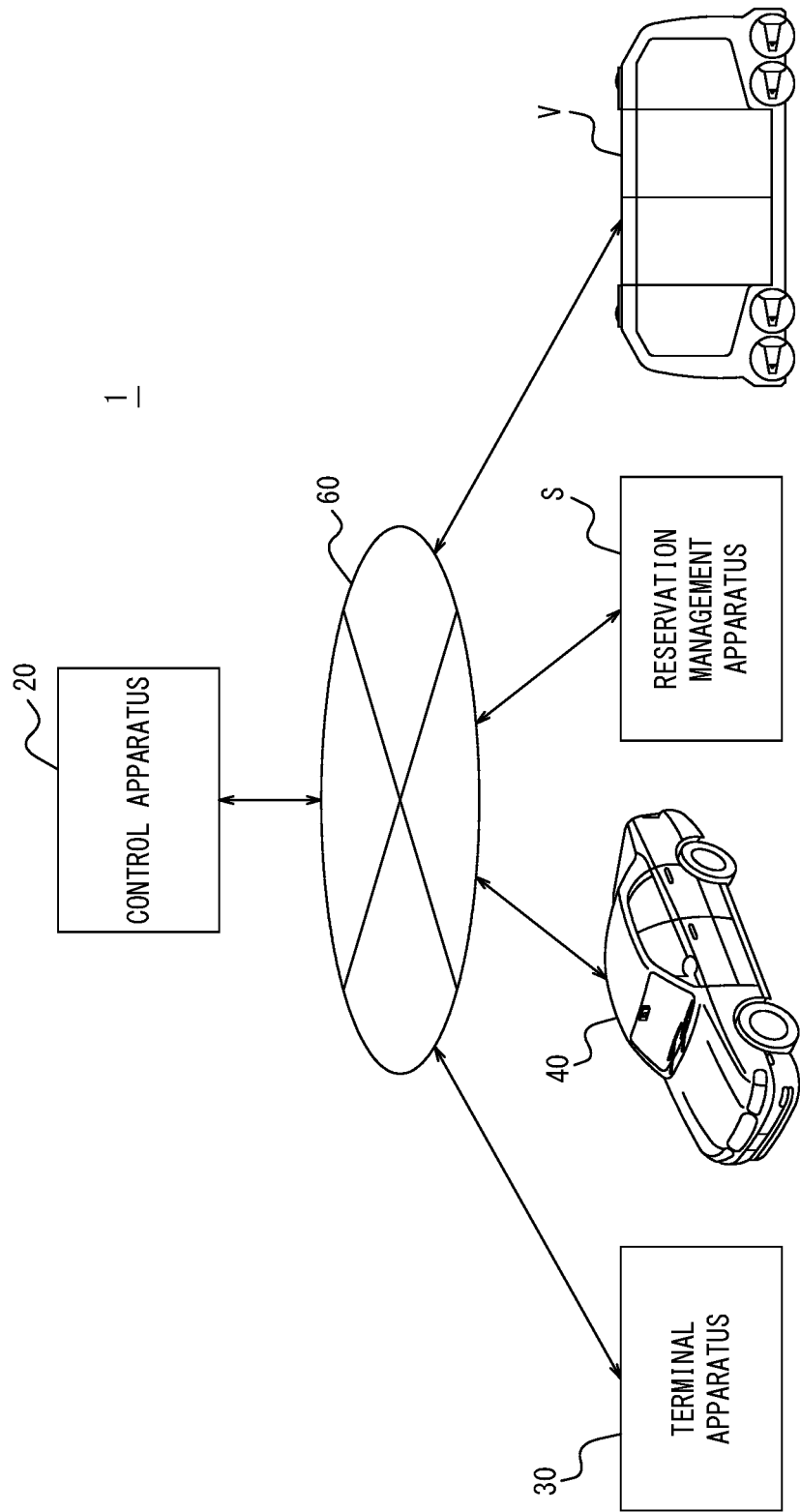
FIG. 1 is a block diagram illustrating a schematic configuration of a system according to the present embodiment.

An outline of a system 1 according to an embodiment of the present disclosure will be described with reference to FIG. 1. The system 1 includes a control apparatus 20, a terminal apparatus 30, a vehicle 40, a reservation management apparatus S, and a vehicle V. The control apparatus 20, terminal apparatus 30, vehicle 40, reservation management apparatus S, and vehicle V are communicably connected to a network 60 that includes, for example, the Internet. For simplicity, only one each of the terminal apparatus 30, vehicle 40, reservation management apparatus S, and vehicle V are illustrated in FIG. 1, but the number of terminal apparatuses 30, vehicles 40, reservation management apparatuses S, and vehicles V may be two or more.

The control apparatus 20 is installed in a facility such as a data center. The control apparatus 20 is, for example, a server that belongs to a cloud computing system or another type of computing system.

The terminal apparatus 30 is held by a user who is to undergo a medical checkup. In the present embodiment, the user refers to the patient during the medical checkup. The terminal apparatus 30 is, for example, a mobile device such as a mobile phone, a smartphone, or a tablet, or a PC. The term "PC" is an abbreviation of personal computer.

The vehicle 40 is an automobile, for example, but is not limited to this, and may be any appropriate vehicle. Automobiles include, but are not limited to, gasoline automobiles, BEVs, HEVs, PHEVs, and FCEVs. The term "BEV" is an abbreviation of battery electric vehicle. The term "HEV" is an abbreviation of hybrid electric vehicle. The term "PHEV" is an abbreviation of plug-in hybrid electric vehicle. The term "FCEV" is an abbreviation of fuel cell electric vehicle. The vehicle 40 may be driven by a driver, or the driving may be automated at any level. The level of automation is, for example, one of level 1 to level 5 according to the classification of the Society of Automotive Engineers (SAE). The vehicle 40 may be a Mobility as a Service (MaaS) dedicated vehicle. The vehicle 40 can transport the user to and from the site for the medical checkup according to the dispatch plan described below. In the present embodiment, the vehicle 40 is a vehicle managed by a taxi company. This example is not limiting, and the vehicle 40 may be any vehicle used in a transportation service, such as a vehicle for a chauffeur service.

The reservation management apparatus S is installed in hospitals and other facilities that organize medical checkups and accepts and manages reservations for medical checkups from users. The reservation management apparatus S is, for example, a server that belongs to a cloud computing system or another type of computing system. The reservation management apparatus S may be installed in the vehicle V as the site for medical checkups, described below.

The vehicle V is a medical checkup vehicle provided with equipment used for medical checkups. Non-limiting examples of the vehicle V include a gasoline automobile, BEV, HEV, PHEV, and FCEV. The vehicle V may be driven by a driver, or the driving may be automated at any level. The automation level is, for example, any one of Level 1 to Level 5 according to the level classification defined by SAE. The vehicle V may be a MaaS-dedicated vehicle. The vehicle V may be managed by a hospital or other entity that organizes medical checkups. The vehicle V can operate and circulate in the area where the user who is to undergo a medical checkup resides.

The network 60 includes the Internet, at least one WAN, at least one MAN, or a combination thereof. The term "WAN" is an abbreviation of wide area network. The term "MAN" is an abbreviation of metropolitan area network. The network 60 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

First, an outline of the present embodiment will be described, and details thereof will be described later. The control apparatus 20 acquires reservation information including a reservation time of a medical checkup for a user and a site of the medical checkup, acquires boarding positional information indicating a boarding position of the user, and generates a dispatch plan for the vehicle 40, that the user boards to travel between the boarding position and the site, based on the reservation information and the boarding positional information.

In the present embodiment, the site for the medical checkup is the vehicle V. This example is not limiting, and the site for the medical checkup may be any location, such as a hospital, clinic, or public facility. The reservation information includes information indicating the reservation time of the user's medical checkup and the site of the medical checkup. The reservation information may include any appropriate information, such as information indicating the user's name, information indicating whether the user is undergoing a medical checkup at the site for the first time, information indicating the time required for the medical checkup, and information indicating checkup items for the user during the medical checkup. The boarding positional information is information indicating the boarding position where the user wishes to board the vehicle 40. The boarding position may be expressed in any format, such as an address or a point or area on a map.

The dispatch plan includes, for the outbound and/or return route, the boarding position at which the user boards the vehicle 40, the departure time of the vehicle 40 from that boarding position, the drop-off position where the user gets off the vehicle 40, and the arrival time of the vehicle 40 at the drop-off position. The vehicle 40 travels with the user on-board between the boarding position and the drop-off position. The boarding position for the outbound route or the drop-off position for the return route may be any location within a predetermined distance from the user's home, such as in front of the user's home. The drop-off position for the outbound route or the boarding position for the return route may be any location within a predetermined distance from the site, such as in front of the site for the medical checkup. The dispatch plan may include information indicating a route on the map from the boarding position to the drop-off position. The control apparatus 20 can notify a taxi company or other operator that arranges the vehicle 40 for the user of the dispatch plan. The control apparatus 20 may notify the vehicle 40 directly of the dispatch plan.

According to the present embodiment, the control apparatus 20 can generate a dispatch plan that takes into account the reservation time and the site for the medical checkup. Based on the generated dispatch plan, the taxi company can arrange the vehicle 40. The burden of traveling to the site of the medical checkup is reduced for the user, since an appropriate vehicle is automatically dispatched to and from the site of the medical checkup. Technology can thus be provided to facilitate a patient's travel to and from the location where the medical checkup is conducted.

Next, configurations of the system 1 will be described in detail.

Figure 2:
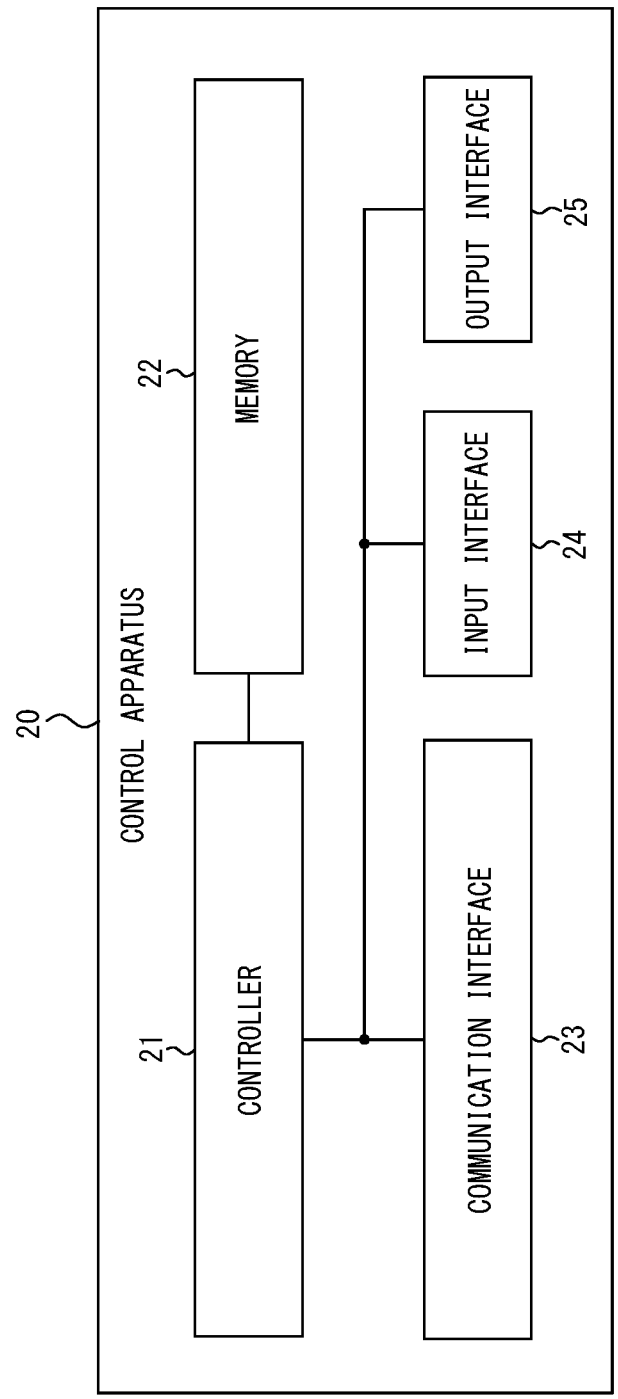
FIG. 2 is a block diagram illustrating a configuration of a control apparatus according to the present embodiment.

As illustrated in FIG. 2, the control apparatus 20 includes a controller 21, a memory 22, a communication interface 23, an input interface 24, and an output interface 25.

The controller 21 includes at least one processor, at least one dedicated circuit, or a combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The dedicated circuit is, for example, an FPGA or an ASIC. The term "FPGA" is an abbreviation of field-programmable gate array. The term "ASIC" is an abbreviation of application specific integrated circuit. The controller 21 executes processes related to operations of the control apparatus 20 while controlling components of the control apparatus 20.

The memory 22 includes at least one semiconductor memory, at least one magnetic memory, at least one optical memory, or a combination of at least two of these. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores information to be used for the operations of the control apparatus 20 and information obtained by the operations of the control apparatus 20. For example, the memory 22 may store a system program, an application program, a database, map information, and the like. The information stored in the memory 22 may be updated with, for example, information acquired from the network 60 via the communication interface 23.

The communication interface 23 includes at least one interface for communication. The interface for communication is, for example, a LAN interface. The communication interface 23 receives information to be used for the operations of the control apparatus 20 and transmits information obtained by the operations of the control apparatus 20.

The input interface 24 includes at least one interface for input. The interface for input is, for example, a physical key, a capacitive key, a pointing device, a touch screen integrally provided with a display, or a microphone. The input interface 24 accepts an operation for inputting data to be used for the operations of the control apparatus 20. The input interface 24, instead of being included in the control apparatus 20, may be connected to the control apparatus as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs data obtained by the operations of the control apparatus 20. The output interface 25, instead of being included in the control apparatus 20, may be connected to the control apparatus 20 as an external output device. As the connection method, any technology such as USB, HDMI® (HDMI is a registered trademark in Japan, other countries, or both), or Bluetooth® (Bluetooth is a registered trademark in Japan, other countries, or both) can be used.

The functions of the control apparatus 20 are realized by execution of a control program according to the present embodiment by a processor corresponding to the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be stored on a non-transitory computer readable medium. Examples of the non-transitory computer readable medium include a magnetic recording device, an optical disk, a magneto-optical storage device, and ROM. The program is distributed by sale, transfer of ownership, or rental of a portable medium, such as a DVD or a CD-ROM, in which the program is stored. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a programmable circuit or a dedicated circuit serving as the controller 21. That is, some or all of the functions of the control apparatus 20 may be realized by hardware.

Figure 3:
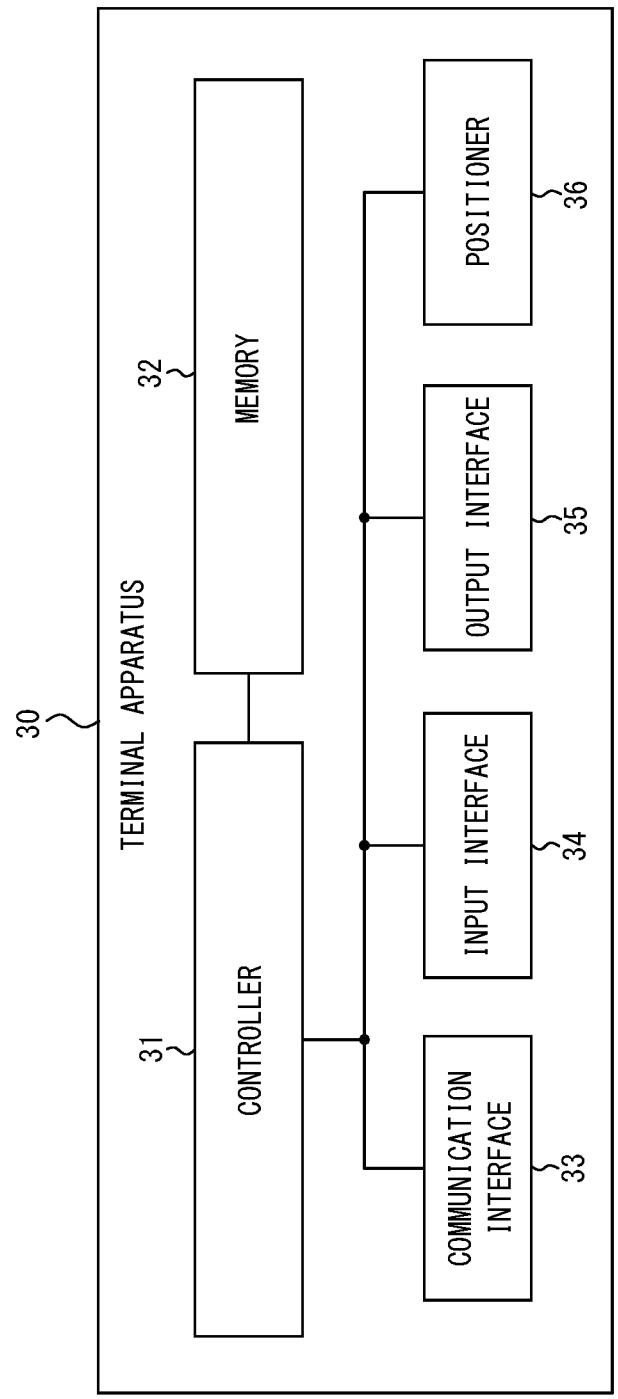
FIG. 3 is a block diagram illustrating a configuration of a terminal apparatus according to the present embodiment.

A configuration of the terminal apparatus 30 according to the present embodiment will be described with reference to FIG. 3.

The terminal apparatus 30 includes a controller 31, a memory 32, a communication interface 33, an input interface 34, an output interface 35, and a positioner 36.

The controller 31 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 31 executes processes related to operations of the terminal apparatus while controlling components of the terminal apparatus 30.

The memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information to be used for the operations of the terminal apparatus 30 and information obtained by the operations of the terminal apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 33 receives information to be used for the operations of the terminal apparatus 30 and transmits information obtained by the operations of the terminal apparatus 30.

The input interface 34 includes at least one interface for input. The interface for input is, for example, a physical key, a capacitive key, a pointing device, a touch screen integrally provided with a display, or a microphone. The input interface 34 accepts an operation for inputting information to be used for the operations of the terminal apparatus 30. The input interface 34, instead of being included in the terminal apparatus 30, may be connected to the terminal apparatus 30 as an external input device. As the connection method, any technology such as USB, HDMI®, or Bluetooth® can be used.

The output interface 35 includes at least one interface for output. The interface for output is, for example, a display, a speaker, or a vibration motor. The display is, for example, an LCD or an organic EL display. The output interface 35 outputs information obtained by the operations of the terminal apparatus 30. The output interface 35, instead of being included in the terminal apparatus 30, may be connected to the terminal apparatus 30 as an external output device. As the connection method, any technology such as USB, HDMI®, or Bluetooth® can be used.

The positioner 36 includes at least one GNSS receiver. The term "GNSS" is an abbreviation of global navigation satellite system. GNSS includes, for example, GPS, QZSS, GLONASS, and/or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The positioner 36 measures the position of the terminal apparatus 30.

The functions of the terminal apparatus 30 are realized by execution of a terminal program according to the present embodiment by a processor corresponding to the controller 31. That is, the functions of the terminal apparatus 30 are realized by software. The terminal program causes a computer to execute the operations of the terminal apparatus 30, thereby causing the computer to function as the terminal apparatus 30. That is, the computer executes the operations of the terminal apparatus 30 in accordance with the terminal program to thereby function as the terminal apparatus 30.

Some or all of the functions of the terminal apparatus 30 may be realized by a programmable circuit or a dedicated circuit serving as the controller 31. That is, some or all of the functions of the terminal apparatus 30 may be realized by hardware.

Figure 4:
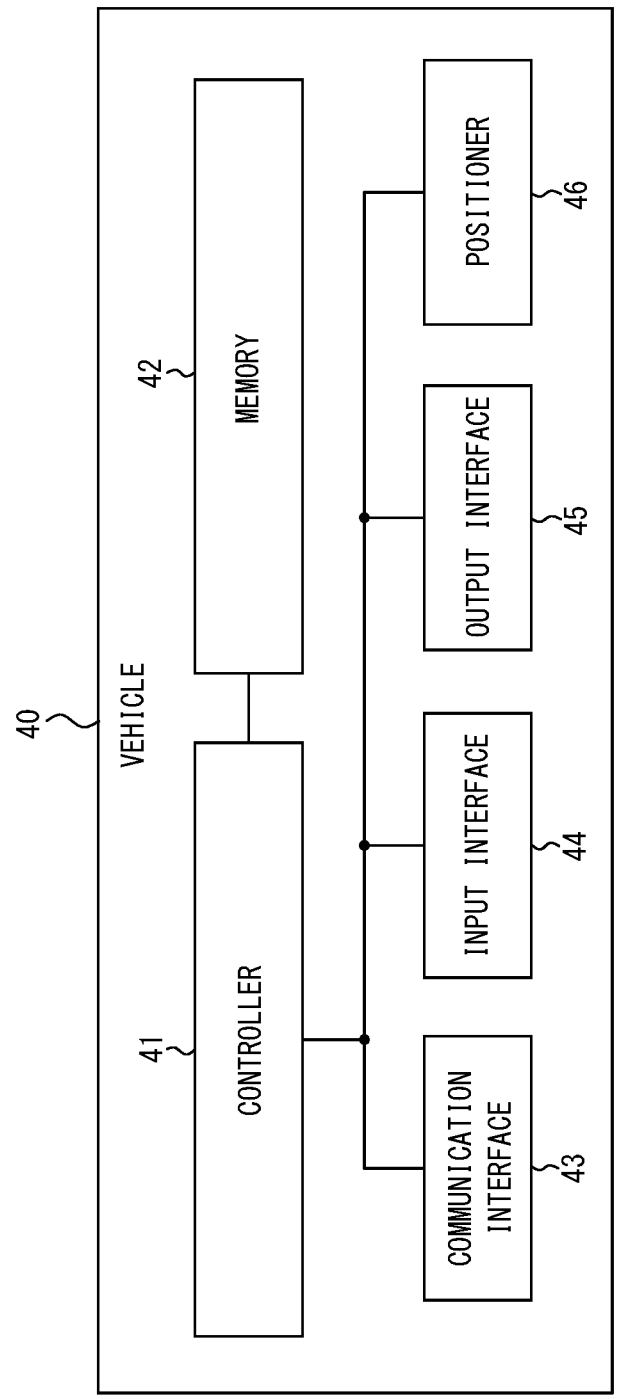
FIG. 4 is a block diagram illustrating a configuration of a vehicle according to the present embodiment.

Referring to FIG. 4, a configuration of the vehicle 40 according to the present embodiment will be described.

The vehicle 40 includes a controller 41, a memory 42, a communication interface 43, an input interface 44, an output interface 45, and a positioner 46. The vehicle 40 is further equipped with various sensors. Each sensor and the controller 41, the memory 42, the communication interface 43, the input interface 44, the output interface 45, and the positioner 46 may be communicably connected to an in-vehicle network, such as a Controller Area Network (CAN).

The controller 41 includes at least one processor, at least one programmable circuit, at least one dedicated circuit, or a combination of these. The processor is a general purpose processor such as a CPU or a GPU, or a dedicated processor that is dedicated to specific processing, for example, but is not limited to these. The programmable circuit is an FPGA, for example, but is not limited to this. The dedicated circuit is an ASIC, for example, but is not limited to this. The controller 41 may include one or more electronic control units (ECUs). The controller 41 controls operations of the vehicle 40 overall while controlling the various components of the vehicle 40.

The memory 42 includes one or more memories. The memories are semiconductor memories, magnetic memories, optical memories, or the like, for example, but are not limited to these. The memories included in the memory 42 may each function as, for example, a main memory, an auxiliary memory, or a cache memory. The memory 42 stores any information used for operations of the vehicle 40.

For example, the memory 42 may store a system program, an application program, a database, and the like. The information stored in the memory 42 may be updated with, for example, information acquired from the network 60 via the communication interface 43.

The communication interface 43 includes at least one interface for communication. The interface for communication is compliant with, for example, a mobile communication standard, mobile communication standards such as 4G or 5G, a wired LAN standard, or a wireless LAN standard but is not limited to these and may be compliant with any communication standard. For example, an in-vehicle communication device such as a DCM (Data Communication Module) may function as the communication interface 43. The communication interface 43 receives information to be used for the operations of the vehicle 40 and transmits information obtained by the operations of the vehicle 40.

The input interface 44 includes at least one interface for input. The interface for input is, for example, a physical key, a capacitive key, a pointing device, a touch screen integrally provided with a display, or a microphone. The input interface 44 accepts an operation for inputting information to be used for the operations of the vehicle 40. The input interface 44 may be connected to the vehicle 40 as an external input device, instead of being provided to the vehicle 40. As the connection method, any technology such as USB, HDMI®, or Bluetooth® can be used.

The output interface 45 includes at least one interface for output. The interface for output is, for example, a display or a speaker. The display is, for example, an LCD or an organic EL display. The output interface 45 outputs information obtained by the operations of the vehicle 40. The output interface 45, instead of being included in the vehicle 40, may be connected to the vehicle as an external output device. As the connection method, any technology such as USB, HDMI®, or Bluetooth® can be used.

The positioner 46 includes at least one GNSS receiver. GNSS includes, for example, GPS, QZSS, BeiDou, GLONASS, and/or Galileo. The positioner 46 measures the position of the vehicle 40.

The functions of the vehicle 40 are realized by a processor, as the controller 41, executing any appropriate vehicle program. That is, the functions of the vehicle 40 are realized by software. The vehicle program causes a computer to execute the operations of the vehicle 40, thereby causing the computer to function as the vehicle 40. That is, the computer executes the operations of the vehicle 40 in accordance with the vehicle program to thereby function as the vehicle 40.

Some or all of the functions of the vehicle 40 may be realized by programmable circuitry or dedicated circuitry as the controller 41. That is, some or all of the functions of the vehicle 40 may be realized by hardware.

Operations of the control apparatus 20 according to the present embodiment will be described with reference to FIGS. 1, 5A, and 5B. These operations correspond to a control method according to the present embodiment. The control apparatus 20 is described below as transmitting and receiving information to and from each external apparatus via the communication interface 23 and the network 60.

In step S101 of FIG. 5A, the controller 21 acquires reservation information including the reservation time of the user's medical checkup and the site of the medical checkup. Any appropriate method may be used to acquire the reservation information. For example, the controller 21 communicates with the reservation management apparatus S in FIG. 1 and receives reservation information from the reservation management apparatus S. This example is not limiting, and the controller 21 may communicate with the terminal apparatus and acquire, as the reservation information, information from the terminal apparatus 30 including the reservation time of the medical checkup and the site of the medical checkup as inputted by the user to the terminal apparatus 30. In the present example, the reservation time for the user's medical checkup included in the reservation information is 14:00 on Apr. 1, 2022, and the site for the medical checkup included in the reservation information is the vehicle V in FIG. 1.

In step S102, the controller 21 acquires boarding positional information indicating the boarding position for the user. Any appropriate method may be employed to acquire the boarding positional information. For example, the controller 21 may read a database, stored in advance in the memory 22, in which home addresses of users are accumulated, identify the user's address from the database based on the user's name indicated by the reservation information, and acquire information indicating the identified address as the boarding positional information. The controller 21 may communicate with the user's terminal apparatus 30 and acquire information, as the boarding positional information, from the terminal apparatus 30 indicating a map position inputted by the user on the terminal apparatus 30. The controller 21 may acquire information, as the boarding positional information, from the terminal apparatus 30 indicating the user's position as measured by the positioner 36 of the terminal apparatus 30. In the present example, the boarding position of the user is a position in front of the user's house.

In step S103, the controller 21 generates a dispatch plan. In the present example, the controller 21 generates the dispatch plan for the outbound and return routes. This example is not limiting, and the controller 21 may create the dispatch plans for only one of the outbound or return routes. The controller 21 can calculate the travel time and the route from the boarding position to the drop-off position using any existing route searching technology. The controller 21 can set the departure and arrival times based on the calculated travel time.

A case in which the controller 21 establishes a dispatch plan for an outbound route is now described. The controller 21 sets the boarding position based on the acquired boarding positional information. The controller 21 can set a position within a predetermined distance from the site indicated by the acquired reservation information as the drop-off position. Specifically, the controller 21 refers to map information stored in the memory 22 or acquired from an external apparatus to identify a position that is within a predetermined distance from the site and at which the vehicle 40 can be temporarily parked to drop off the user. The controller 21 then sets this position as the drop-off position. In a case in which the site is a medical checkup vehicle, the controller 21 may be able to further acquire information, from the medical checkup vehicle or an external apparatus, indicating the parking location of the medical checkup vehicle. In the present example, the controller 21 acquires information indicating the position where the vehicle V as the site parks to hold the medical checkup. The controller 21 sets a parking lot P within a predetermined distance from the acquired position as the drop-off position.

The controller 21 may set the departure time so as to arrive a predetermined amount of time earlier than the reservation time of the medical checkup included in the acquired reservation information. The controller 21 can set the predetermined amount of time freely, for example by site. The controller 21 may set the arrival time as the set departure time plus the travel time. In a case in which the acquired reservation information includes information indicating that the user is undergoing a medical checkup at the site for the first time, the controller 21 may set the departure time and arrival time so that the user can arrive at the site earlier than in the case of undergoing a medical checkup for the second or subsequent time at the site. This enables the user to arrive at the site with time to spare, even in the case of undergoing a medical checkup for the first time.

A case in which the controller 21 establishes a dispatch plan for a return route is now described. The controller 21 can set the drop-off position in the outbound route as the boarding position in the return route and can set the boarding position in the outbound route as the drop-off position in the return route. The controller 21 may set a time yielded by adding a predetermined amount of time to the reservation time of the medical checkup included in the acquired reservation information as the departure time of the return route. The controller 21 can set the predetermined amount of time freely. In a case in which the acquired reservation information includes information indicating the time required for the medical checkup, the controller 21 may set a time yielded by adding the time required to the reservation time of the medical checkup as the departure time for the return route.

In a case in which the acquired reservation information includes information indicating the checkup items for the user during the medical checkup, the controller 21 may set the departure time based on such information. Specifically, the controller 21 reads information, stored in advance in the memory 22, indicating the time required for each checkup item and totals the time required for the checkup items for the user indicated by the reservation information. For example, assume that the checkup items for the user indicated by the reservation information are A, B, and C. The controller 21 totals the time required for each of A, B, and C. In the present example, assume that the total time required for A, B, and C is 2 hours. The controller 21 can set a time yielded by adding two hours to the reservation time of the medical checkup as the departure time. This enables the controller 21 to set the departure time accurately, according to the content of the reservation, so as to enable the user to board the vehicle 40 without waiting after the medical checkup is completed.

Table 1 is an example of information indicating a dispatch plan. Table 1 lists the information indicating the dispatch plan in table format, but the format of the information is not limited to this example. The dispatch plan in the present example includes routes on the map for the outbound route and inbound route between the front of the user's house and the parking lot P.

TABLE 1

| Outbound route | departure time | Apr. 1, 2022 13:30 | boarding position | in front of user's house |
|---|---|---|---|---|
| | arrival time | Apr. 1, 2022 13:55 | drop-off position | parking lot P |
| Return route | departure time | Apr. 1, 2022 16:00 | boarding position | parking lot P |
| | arrival time | Apr. 1, 2022 16:30 | drop-off position | in front of user's house |

In the dispatch plan of the present example, the user boards the vehicle in front of the user's house, and the vehicle 40 departs at 13:30 on Apr. 1, 2022. The vehicle 40 arrives at the parking lot P at 13:55 on Apr. 1, 2022, and the user gets off the vehicle 40. After the medical checkup, the user boards the vehicle 40 again in the parking lot P, and the vehicle 40 departs at 16:00 on Apr. 1, 2022. The vehicle 40 arrives in front of the user's house at 16:30 on Apr. 1, 2022, and the user gets off the vehicle 40.

As illustrated by steps S101 to S103, the controller 21 acquires boarding positional information indicating a boarding position of the user and generates a dispatch plan for the vehicle 40, that the user boards to travel between the boarding position and the site, based on the reservation information and the boarding positional information.

In step S104, the controller 21 acquires traffic information indicating the traffic conditions of the route along which the vehicle 40 travels. The traffic information indicates the degree of current or future road traffic and the existence of road closures and other restrictions on the roads along the route included in the dispatch plan. The degree of traffic may be indicated in a stepwise manner, such as "heavy", "medium", "light", or the like. Any appropriate method may be used to acquire the traffic information. For example, the controller 21 can acquire the traffic information by receiving the traffic information from a server apparatus of a traffic information provision center or the like.

In step S105, the controller 21 determines, based on the traffic information acquired in step S104, whether to modify the outbound route of the dispatch plan generated in step S103. A case in which the dispatch plan is modified is, for example, the case of the traffic conditions requiring more time for travel of the vehicle 40 compared to the traffic conditions of the outbound route at the time the dispatch plan was generated, such as the case of the traffic information indicating a certain degree of traffic or the existence of road closures along the route included in the dispatch plan. In a case in which the controller 21 determines to modify the dispatch plan (step S105: YES), operations of the controller 21 proceed to step S106. In a case in which it is determined not to modify the dispatch plan (step S105: NO), operations of the controller 21 proceed to step S107.

In step S106, the controller 21 modifies the dispatch plan. The controller 21 can modify the dispatch plan by changing the routes included in the dispatch plan so that the vehicle 40 can avoid the traffic or road closures. Any route searching technology may be employed to determine the modified route. The controller 21 may modify the dispatch plan by moving up the departure time by a predetermined amount of time so as to make the arrival time even if the route has traffic.

In step S107, the controller 21 notifies the taxi company that arranges the vehicle 40 of the dispatch plan generated in step S103 or modified in step S106.

Specifically, the controller 21 first identifies a taxi company within a predetermined distance from the site of the medical checkup based on map information. The map information may be stored in advance in the memory 22 or received from an external apparatus via the communication interface 23. The predetermined distance may be set freely. The controller 21 may identify a taxi company that includes the site of the medical checkup within its operating area. The controller 21 generates information providing notification of the dispatch plan and transmits the information to a server apparatus of the identified taxi company. In this way, the controller 21 notifies the taxi company of the dispatch plan. Based on the notified dispatch plan, the server apparatus of the taxi company can automatically execute a process for dispatch reservation and arrange a taxi as the vehicle 40 to travel according to the dispatch plan. The controller 21 may transmit the information to a terminal apparatus in the possession of an employee of the taxi company. In this case, the employee of the taxi company can arrange a taxi as the vehicle 40 to travel according to the dispatch plan.

The controller 21 may transmit the dispatch plan directly to the vehicle 40. The vehicle 40 that has received the dispatch plan travels according to the dispatch plan. The vehicle 40 may be able to travel by automatic operation. Specifically, the controller 41 of the vehicle 40 receives the dispatch plan from the control apparatus 20 via the communication interface 43. The controller 41 can control the components of the vehicle 40 for travel along the route included in the dispatch plan so as to pick up the user at the boarding position included in the dispatch plan, depart at the departure time, and drop off the user at the drop-off position at the arrival time.

In step S108, the controller 21 acquires congestion information indicating the degree of congestion at the site.

The degree of congestion may be indicated in a stepwise manner, such as "heavy", "medium", "light", or the like. Any appropriate method may be used to acquire the congestion information. For example, the controller 21 communicates with a camera, installed at the site to capture images of the conditions at the site, and receives the images captured by the camera. The controller 21 can acquire congestion information by analyzing the received images using any appropriate image processing technology to determine the degree of congestion. For example, the controller 21 can determine that as the number of people appearing in images of the site's waiting room captured by the camera is greater, the degree of congestion is greater. This example is not limiting, and the controller 21 may communicate with a terminal apparatus in the possession of an employee at the site and acquire information, inputted by the employee, indicating the degree of congestion at the site as the congestion information. In the present example, assume that the congestion information acquired by the controller 21 indicates "medium".

In step S109, the controller 21 acquires additional checkup information indicating additional checkup items that the user is to receive additionally.

The additional checkup information includes checkup items that the user determines to receive additionally after the dispatch plan is generated. Checkup items that the user determines to receive additionally are, for example, checkup items that the doctor recommends the user to receive additionally during the medical checkup. Any appropriate method may be used to acquire the additional items. For example, the controller 21 may communicate with the reservation management apparatus S and acquire additional checkup information from the reservation management apparatus S. This example is not limiting, and the controller 21 may acquire, as the additional checkup information, information from the user's terminal apparatus 30 indicating checkup items to be received additionally as inputted to the terminal apparatus by the user. In the present example, assume that the additional checkup information acquired by the controller 21 indicates checkup items D and E.

In step S110 of FIG. 5B, the controller 21 acquires traffic information indicating the traffic conditions of the route along which the vehicle 40 travels. Details on step S110 are similar to step S104, and thus a description thereof is omitted.

In step S111, the controller 21 determines whether to modify the return route of the dispatch plan. The controller 21 may determine whether to modify the dispatch plan based on the congestion information acquired in step S108. The controller 21 may determine whether to modify the dispatch plan based on the additional checkup information acquired in step S109, instead of or in addition to the congestion information. The controller 21 may determine whether to modify the dispatch plan based on the traffic information acquired in step S110, instead of or in addition to the congestion information and/or the additional checkup information. In a case in which the controller 21 determines to modify the dispatch plan (step S111: YES), operations of the controller 21 proceed to step S112. In a case in which the controller 21 determines not to modify the dispatch plan (step S111: NO), operations of the controller 21 proceed to step S114.

Based on the congestion information, the controller 21 can determine to modify the dispatch plan in a case in which the degree of congestion is a predetermined value. The predetermined value may be determined freely. For example, the controller 21 may determine to modify the dispatch plan when the degree of congestion is "medium" or "heavy". This example is not limiting, and the controller 21 may, for example, acquire information recording the degree of congestion at the same site in the past and determine to modify the dispatch plan in a case in which the degree of congestion indicated by the congestion information is greater than the past degree of congestion. In the present example, the degree of congestion indicated by the congestion information is "medium". The controller 21 therefore determines to modify the dispatch plan.

Based on the additional checkup information, the controller 21 can determine to modify the dispatch plan in a case in which the time required for the additional checkup items is equal to or greater than a predetermined value. In this case, the controller 21 reads information, stored in advance in the memory 22, indicating the time required for each checkup item and identifies the time required for the additional checkup items indicated by the additional checkup information. The controller 21 may determine to modify the dispatch plan in a case in which the total of the identified required times is equal to or greater than a predetermined value. For example, assume that the information indicating the time required for each checkup item indicates 10 minutes for checkup item D, 20 minutes for checkup item E, and 30 minutes for checkup item F. In the present example, the additional checkup information indicates that the checkup items are D and E, and that the predetermined value is 15 minutes. Since the total time required for D and E is 30 minutes, which is greater than the predetermined value of 15 minutes, the controller 21 determines to modify the dispatch plan. This example is not limiting, and the controller 21 may determine to modify the dispatch plan in a case in which the number of additional checkup items is equal to or greater than a predetermined value.

Based on the traffic information, the controller 21 may determine to modify the dispatch plan in a case in which the traffic conditions require more time for travel of the vehicle 40 compared to the traffic conditions of the return route at the time the dispatch plan was generated, such as the case of the traffic information indicating a certain degree of traffic or the existence of road closures along the route included in the dispatch plan. In the present example, the degree of traffic indicated by the traffic information is "light". The controller 21 therefore determines not to modify the dispatch plan.

The controller 21 may determine to modify the dispatch plan when determining that the dispatch plan is to be modified based on the congestion information, the additional checkup information, or the traffic information. In the present example, the controller 21 determines to modify the dispatch plan based on the congestion information and the additional checkup information. The operations by the controller 21 therefore proceed to step S112.

In step S112, the controller 21 modifies the dispatch plan. The controller 21 may modify the dispatch plan based on the congestion information acquired in step S108. The controller 21 may modify the dispatch plan based on the additional checkup information acquired in step S109, instead of or in addition to the congestion information. The controller 21 may modify the dispatch plan based on the traffic information acquired in step S110, instead of or in addition to the congestion information and/or the additional checkup information.

A case in which the dispatch plan is modified based on the congestion information is now described. The controller 21 may determine to delay the departure time from the site included in the dispatch plan by a predetermined amount of time as the degree of congestion indicated by the congestion information increases and may modify the dispatch plan to reflect such a determination. For example, in a case in which the degree of congestion at the site indicated by the congestion information is "medium", the controller 21 may determine to delay the departure time from the site by 30 minutes and modify the dispatch plan. In a case in which the degree of congestion is "heavy", the controller 21 may determine to delay the departure time from the site by one hour and modify the dispatch plan to reflect such a determination.

A case in which the dispatch plan is modified based on the additional checkup information is now described. The controller 21 may determine to delay the departure time from the site included in the dispatch plan by a predetermined amount of time according to the type of additional checkup items indicated by the additional checkup information and may modify the dispatch plan to reflect such a determination. Specifically, the controller 21 reads information, stored in advance in the memory 22, indicating the time required for each checkup item and totals the time required for the additional checkup items indicated by the additional checkup information. In the present example, the additional checkup items indicated by the additional checkup information are D and E, and the total time required for these items is 30 minutes. The controller 21 may determine to delay the departure time for the outbound route by 30 minutes and modify the dispatch plan to reflect this determination.

A case in which the dispatch plan is modified based on the traffic information is now described. The controller 21 may determine to change the routes included in the plan so that the vehicle 40 can avoid the traffic or road closures and may modify the dispatch plan to reflect this determination. Any route searching technology may be employed to determine the modified route.

In the present example, assume that the controller 21 determines to delay the departure time for the outbound route of the dispatch plan by 30 minutes based on the congestion information. Further assume that the controller 21 determines to delay the departure time by another 30 minutes based on the additional checkup information. The controller 21 determines to delay the departure time by one hour, which is the total of the determined amounts of time, and modifies the dispatch plan to reflect this determination.

Methods for modifying the dispatch plans based on the congestion information, the additional checkup information, and the traffic information are not limited to this example. For example, assume that the controller 21 determines to delay the departure time for the outbound route by X minutes based on the congestion information, determines to delay the departure time for the outbound route by Y minutes based on the additional checkup information, and determines to delay the departure time for the outbound route by Z minutes based on the traffic information. The controller 21 may determine to delay the departure time by the sum of the determined X, Y, and Z values each multiplied by a predetermined factor and may modify the dispatch plan to reflect this determination.

The dispatch plan modified by the controller 21 in the present example is illustrated in Table 2. In the dispatch plan in Table 2, the departure time from the parking lot P for the return route is modified from 16:00 on Apr. 1, 2022 in the dispatch plan in Table 1 to 17:00.

TABLE 2

| Outbound route | departure time | Apr. 1, 2022 13:30 | boarding position | in front of user's house |
|---|---|---|---|---|
| | arrival time | Apr. 1, 2022 13:55 | drop-off position | parking lot P |
| Return route | departure time | Apr. 1, 2022 17:00 | boarding position | parking lot P |
| | arrival time | Apr. 1, 2022 17:30 | drop-off position | in front of user's house |

The controller 21 modifies the dispatch plan by delaying the estimated arrival time by the estimated boarding time. In the dispatch plan in Table 2, the estimated arrival time at the user's home is modified from 16:30 on Apr. 1, 2022 in the dispatch plan in Table 1 to 17:30. The controller 21 stores the modified dispatch plan in the memory 22.

As illustrated in step S108, step S111, and step S112, the controller 21 acquires congestion information indicating the degree of congestion at the site and modifies the dispatch plan according to the congestion information. As illustrated in step S109, step S111, and step S112, the controller 21 acquires additional checkup information indicating additional checkup items and modifies the dispatch plan according to the additional checkup information. As illustrated in steps S104 to S106 and steps S110 to S112, the controller 21 acquires traffic information indicating the traffic conditions along the route traveled by the vehicle 40 and modifies the dispatch plan based on the traffic information.

In step S113, the controller 21 notifies the taxi company of the dispatch plan modified in step S112. The controller 21 can again notify the taxi company that was notified of the dispatch plan in step S107.

Specifically, the controller 21 transmits information indicating the modified dispatch plan to the server apparatus of the taxi company. In this way, the controller 21 notifies the taxi company of the modified dispatch plan. The server apparatus of the taxi company can thereby automatically execute a process for dispatch reservation and again arrange a taxi as the vehicle 40 to travel according to the modified dispatch plan. The controller 21 may transmit the information to a terminal apparatus in the possession of an employee of the taxi company. This enables the employee of the taxi company again to arrange a taxi as the vehicle 40 to travel according to the modified dispatch plan.

In a case in which a vehicle cannot be dispatched under the modified dispatch plan, the server apparatus of the taxi company or the terminal apparatus of the taxi company employee can transmit information to that effect to the control apparatus 20. Upon receiving such information, the controller 21 may identify another taxi company within a predetermined distance from the site based on the map information and transmit information indicating the modified dispatch plan to the identified taxi company. This enables the user to return home reliably aboard the vehicle 40 even in a case in which the return route in the dispatch plan is modified.

The controller 21 may transmit the modified dispatch plan directly to the vehicle 40. The vehicle 40 that has received the modified dispatch plan travels according to the dispatch plan. The vehicle 40 may be able to travel by automatic operation.

In step S114, the controller 21 determines a reward to grant to the taxi company.

The controller 21 may determine the reward based on whether the vehicle 40 was able to travel according to the dispatch plan. Specifically, the controller 21 communicates with the vehicle 40 and acquires vehicle positional information indicating the position of the vehicle 40 as measured by the positioner 46 in the vehicle 40. Based on the vehicle positional information, the controller 21 determines whether the vehicle 40 departed from the boarding position within a predetermined time difference from the departure time included in the dispatch plan. The controller 21 may determine to grant the reward in a case in which it is determined that the vehicle 40 departed from the boarding position within a predetermined time difference from the departure time included in the dispatch plan. In this case, the controller 21 may determine to grant a higher reward as the time difference is smaller.

This example is not limiting, and any suitable method may be employed for the controller 21 to determine the reward. For example, the controller 21 may receive information, from the terminal apparatus 30 of the user, indicating the user's evaluation of the vehicle 40 after riding the vehicle 40 and determine the reward based on such information.

The content of the reward may be set freely. The reward may, for example, include the right to receive priority notification of dispatch plans, coupons or points usable to pay for the energy supply of the vehicle 40, or the like. In a case in which the reward is the right to receive priority notification of dispatch plans, the controller 21 may identify the corresponding taxi company on a priority basis when generating the next dispatch plan and notify the taxi company of the dispatch plan.

In step S115, the controller 21 notifies the taxi company of the determined reward. Specifically, the controller 21 generates information indicating the determined reward and transmits the information to the server or the like of the taxi company to which the dispatch plan was transmitted. This example is not limiting, and the controller 21 may transmit information indicating the reward directly to a terminal apparatus in the possession of a taxi company employee or to the vehicle 40. Thereafter, the operations by the controller 21 end.

As described above, the control apparatus 20 includes a controller configured to acquire reservation information including a reservation time of a medical checkup for a user and a site of the medical checkup, acquire boarding positional information indicating a boarding position of the user, and generate a dispatch plan for a vehicle 40, that the user boards to travel between the boarding position and the site, based on the reservation information and the boarding positional information.

According to the present embodiment, the dispatch plan is automatically generated according to the reservation information of the medical checkup. This makes it easier for users to get to the medical checkup site in time for the medical checkup and return from the site after the medical checkup, even if they live far away from the site of the medical checkup. Technology can thus be provided to facilitate a patient's travel to and from the location where the medical checkup is conducted.

As described above, in the control apparatus 20, the controller 21 acquires congestion information indicating the degree of congestion at the site and modifies the dispatch plan according to the congestion information.

According to the present embodiment, even if the medical checkup site is crowded and the time required for the medical checkup increases, the user can undergo the medical checkup with peace of mind, without worrying about the return route. Technology can thus be provided to facilitate a patient's travel to and from the location where the medical checkup is conducted.

As described above, in the control apparatus 20, the controller 21 acquires additional checkup information indicating an additional checkup item and modifies the dispatch plan according to the additional checkup information.

According to the present embodiment, even if the user wishes to receive additional checkup items during the medical checkup, the user can receive the medical checkup with peace of mind, without worrying about the return route. Technology can thus be provided to facilitate a patient's travel to and from the location where the medical checkup is conducted.

As described above, in the control apparatus 20, the controller 21 notifies a taxi company that arranges the vehicle 40 of the dispatch plan.

According to the present embodiment, the vehicle 40 that travels according to the dispatch plan is arranged without the user himself having to make a reservation with the taxi company for dispatch. Technology can thus be provided to facilitate a patient's travel to and from the location where the medical checkup is conducted.

As described above, in the control apparatus 20, the controller 21 identifies a taxi company within a predetermined distance from the site as the taxi company.

According to the present embodiment, a taxi company in the vicinity of the medical checkup site is notified of the dispatch plan, thus increasing the probability of a successful dispatch reservation for the vehicle 40. The user does not need to search for a taxi company that can be reliably booked, thereby reducing the hassle for the user in getting to and from the medical checkup site. Technology can thus be provided to facilitate a patient's travel to and from the location where the medical checkup is conducted.

As described above, in the control apparatus 20, the controller 21 determines a reward to grant to the taxi company.

According to the present embodiment, a reward is granted, thereby increasing the likelihood that the vehicle 40 arranged by the taxi company will travel according to the dispatch plan. By the vehicle 40 traveling according to the dispatch plan, the user can travel to and from the medical checkup site with peace of mind. Technology can thus be provided to facilitate a patient's travel to and from the location where the medical checkup is conducted.

As described above, in the control apparatus 20, the controller 21 acquires traffic information indicating traffic conditions of a route along which the vehicle travels and modifies the dispatch plan based on the traffic information.

According to the present embodiment, an appropriate dispatch plan is automatically generated and the vehicle 40 is arranged, even if travel takes longer than usual due to traffic on the roads along the route to the medical checkup site. This eliminates the need for the user to worry about round-trip travel. Technology can thus be provided to facilitate a patient's travel to and from the location where the medical checkup is conducted.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided. For example, an embodiment in which the configuration and operations of the control apparatus 20 in the above embodiment are distributed to multiple computers capable of communicating with each other can be implemented.

The invention claimed is:

1. A control apparatus comprising:
a communication interface configured to communicate with a vehicle and a terminal apparatus of a user;
a memory configured to store information indicating a time required for each checkup item; and
a controller configured to:
receive, from the terminal apparatus via the communication interface, reservation information including a reservation time of a medical checkup for the user and a site of the medical checkup;
receive, from the terminal apparatus via the communication interface, boarding positional information indicating a boarding position of the user; and
generate a dispatch plan for the vehicle, that the user boards to travel between the boarding position and the site, based on the reservation information and the boarding positional information,
wherein the controller is further configured to:
receive, from the terminal apparatus via the communication interface, additional checkup information indicating at least one additional checkup item;
identify a time required for the at least one additional checkup item based on the information indicating the time required for each checkup item;
when a total of the identified time required is equal to or greater than a predetermined value, modify the dispatch plan by delaying a departure time of the vehicle from the site;
transmit, via the communication interface, the modified dispatch plan to the vehicle; and
wherein the vehicle is configured to receive the modified dispatch plan and autonomously travel from the site to the boarding position according to the modified dispatch plan.

2. The control apparatus according to claim 1, wherein the controller is configured to acquire congestion information indicating a degree of congestion at the site and modify the dispatch plan according to the congestion information.

3. The control apparatus according to claim 1, wherein the controller is configured to notify a taxi company that arranges the vehicle of the dispatch plan.

4. The control apparatus according to claim 3, wherein the controller is configured to identify a taxi company within a predetermined distance from the site as the taxi company.

5. The control apparatus according to claim 3, wherein the controller is configured to determine a reward to grant to the taxi company.

6. The control apparatus according to claim 1, wherein the controller is configured to acquire traffic information indicating traffic conditions of a route along which the vehicle travels and modify the dispatch plan based on the traffic information.

7. A control method to be performed by a computer comprising a communication interface configured to communicate with a vehicle and a terminal apparatus of a user, and a memory configured to store information indicating a time required for each checkup item, the control method comprising:
  receiving, from the terminal apparatus, via the communication interface, reservation information including a reservation time of a medical checkup for the user and a site of the medical checkup;
  receiving, from the terminal apparatus, via the communication interface, boarding positional information indicating a boarding position of the user;
  generating a dispatch plan for the vehicle, that the user boards to travel between the boarding position and the site, based on the reservation information and the boarding positional information;
  receiving, from the terminal apparatus via the communication interface, additional checkup information indicating at least one additional checkup item;
  identifying a time required for the at least one additional checkup item based on the information indicating the time required for each checkup item;
  when a total of the identified time required is equal to or greater than a predetermined value, modifying the dispatch plan by delaying a departure time of the vehicle from the site;
  transmitting, via the communication interface, the modified dispatch plan to the vehicle;
  wherein the vehicle is configured to receive the modified dispatch plan and autonomously travel from the site to the boarding position according to the modified dispatch plan.

8. The control method according to claim 7, further comprising
  acquiring congestion information indicating a degree of congestion at the site; and
  modifying the dispatch plan according to the congestion information.

9. The control method according to claim 7, further comprising notifying a taxi company that arranges the vehicle of the dispatch plan.

10. The control method according to claim 9, further comprising identifying a taxi company within a predetermined distance from the site as the taxi company.

11. The control method according to claim 9, further comprising determining a reward to grant to the taxi company.

12. The control method according to claim 7, further comprising
  acquiring traffic information indicating traffic conditions of a route along which the vehicle travels; and
  modifying the dispatch plan based on the traffic information.

13. A system comprising:
  a control apparatus;
  a vehicle; and
  a terminal apparatus of a user,
  wherein the control apparatus comprises:
  a communication interface configured to communicate with the vehicle and the terminal apparatus of the user;
  a memory configured to store information indicating a time required for each checkup item; and
  a controller configured to
  receive, from the terminal apparatus via the communication interface, reservation information including a reservation time of a medical checkup for the user and a site of the medical checkup,
  receive, from the terminal apparatus via the communication interface, boarding positional information indicating a boarding position of the user,
  generate a dispatch plan for the vehicle, that the user boards to travel between the boarding position and the site, based on the reservation information and the boarding positional information,
  receive, from the terminal apparatus via the communication interface, additional checkup information indicating at least one additional checkup item,
  identify a time required for the at least one additional checkup item based on the information indicating the time required for each checkup item,
  when a total of the identified time required is equal to or greater than a predetermined value, modify the dispatch plan by delaying a departure time of the vehicle from the site, and transmit, via the communication interface, the modified dispatch plan to the vehicle,
  wherein the vehicle is configured to receive the modified dispatch plan and autonomously travel from the site to the boarding position according to the modified dispatch plan.

14. The system according to claim 13, wherein the controller is configured to acquire congestion information indicating a degree of congestion at the site and modify the dispatch plan according to the congestion information.

15. The system according to claim 13, wherein the controller is configured to notify a taxi company that arranges the vehicle of the dispatch plan.

16. The system according to claim 15, wherein the controller is configured to identify a taxi company within a predetermined distance from the site as the taxi company.

17. The system according to claim 15, wherein the controller is configured to determine a reward to grant to the taxi company.

18. The system according to claim 13, wherein the controller is configured to acquire traffic information indicating traffic conditions of a route along which the vehicle travels and modify the dispatch plan based on the traffic information.

* * * * *